Jan. 4, 1955     H. GRIDEL ET AL     2,698,539
APPARATUS FOR MEASURING A LIQUID LEVEL
Filed Sept. 26, 1950     2 Sheets-Sheet 1

INVENTORS.
HENRI GRIDEL
JEAN VALEMBOIS
BY Paul Kolisch
ATTORNEY.

Jan. 4, 1955

H. GRIDEL ET AL 2,698,539

APPARATUS FOR MEASURING A LIQUID LEVEL

Filed Sept. 26, 1950

INVENTORS.
HENRI GRIDEL
JEAN VALEMBOIS
BY Paul Kolisch
ATTORNEY.

United States Patent Office 2,698,539
Patented Jan. 4, 1955

2,698,539

APPARATUS FOR MEASURING A LIQUID LEVEL

Henri Gridel, Paris, and Jean Valembois, Becon les Bruyeres, France, assignors to Electricite de France, Paris, France, a corporation of France Application September 26, 1950, Serial No. 186,712

Claims priority, application France September 29, 1949

7 Claims. (Cl. 73—304)

The invention provides a device for measuring the height of the surface of an electrically conducting liquid, comprising an electrically conducting element, means for effecting oscillatory movement of the element into and out of contact with the liquid at a predetermined frequency and with a predetermined amplitude of movement, an electric circuit including the element and the liquid so that the circuit is completed each time the element contacts the liquid, and measuring means in the circuit for measuring the fraction of each period of movement for which the element is in contact with the liquid.

The invention includes a device for controlling in a vessel the height of the surface of an electrically conducting liquid contained therein, comprising means controlled by the measuring means of a device as aforesaid for controlling the amount of the liquid.

The device for measuring the height of a liquid according to the invention may comprise a vertical needle having a point directed downwards, a motor driving said needle axially so that its point will penetrate through the liquid surface, and a measuring circuit in which is included the liquid, the needle and an electrical measuring instrument.

The vibrating contact is preferably formed by a downwardly directed point, which enables it to pierce, on each vibration, the surface layer of liquid while displacing it only very slightly. The frequency of vibration selected is relatively rapid, while the influence of surface tension is practically eliminated; this result is reached very easily and very conveniently by selecting the electrical mains supply frequency of 50 cycles per second, for example.

The invention enables measurements to be made with very great accuracy, which is moreover variable at will by variation of the amplitude of the vibration of the point.

The characteristics and advantages of the invention will moreover be clear from the description below of certain embodiments selected solely by way of example, with reference to the attached drawings, in which.

Figure 1:
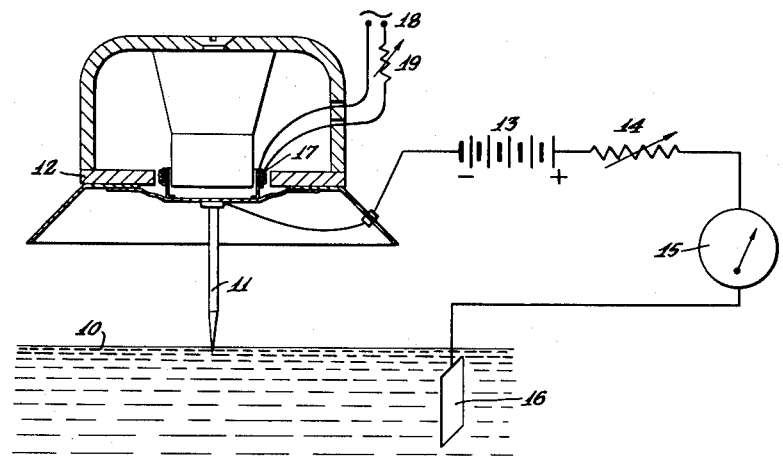
Figure 1 shows schematically a simplified device permitting the realisation of the method according to the invention.

According to the embodiment selected and illustrated in Fig. 1, there is disposed above the level to be measured or controlled of a liquid mass or reservoir 10 a fine vertical point 11 (for example a sewing needle), driven with a periodic vertical vibration by a loud speaker motor 12. The point 11 is included in an electric measuring circuit which has a source of current 13, a relatively high variable resistance 14, and a measuring instrument 15, for example a micro-ammeter. The circuit is completed by an immersed electrode 16. The resistance 14 should be sufficiently high for the resistance between the point 11 and the liquid to be negligible when the point pierces the surface layer of the liquid. The vibration of the point 11 may be sinusoidal or otherwise, but it must be fixed.

The loudspeaker motor 12 being, for example, of the permanent magnet type, it is sufficient to connect its moving coil 17 to a source of alternating current at 18 (for example the mains), a rheostat 19 enabling the intensity of the current absorbed by that coil, and hence the amplitude of the movement of the point, to be adjusted. It is seen that under these circumstances, the point forms with the liquid mass a periodically operated switch, the current being made or broken in the measuring circuit depending on whether the point is immersed or not.

Figure 2:
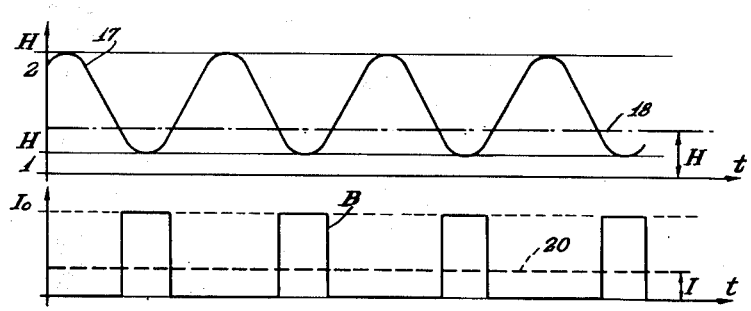
Figures 2 and 3 are graphs relating to the functioning of that device.

Fig. 2 shows at 17 the plot against time of the lower end of the point 11, which oscillates periodically between the lower limit H1 and the upper limit H2. It is seen that if the surface of the liquid is contained between those two limits, for example at 18, the point will be immersed on each oscillation for a period of time which will be determined by the height H of the liquid. This produces a pulsed current represented by the curve B as a function of time, whose mean value is I as, indicated by the broken line 20.

Figure 3:
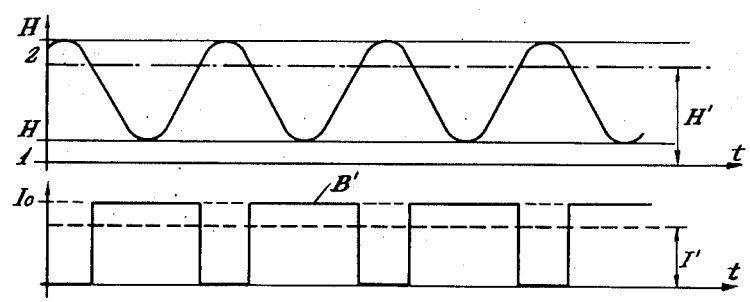

When the level of the liquid increases from H to H' (Fig. 3), the duration of each closure of the circuit, i. e. of each current impulse, increases, as is shown by the curve B', and the mean value of the current becomes I'.

The instrument 15 will consequently indicate—provided only that its natural period is far greater than the period of vibration of the point—a mean current which will be a function of the level of the liquid in relation to the movement limits of the lower end of the point. This current will be zero for a level lower or equal to the lower limit H1; it will be constant (Io) for a level higher or equal to the upper limit H2. This constant value Io depends solely on the voltage of the source 13 and the value of the resistance 14. The mean current measured at 15 varies between zero and the constant Io value when the level rises from H1 to H2. The relation between the variation of the current and the variation of the level between the two values H1 and H2 is a function of the shape of the vibration of the needle. It will be linear if the curve representing the movement of the needle end plotted against time is a serrated curve. For a sinusoidal vibration of the needle, that relation is linear at least in the proximity of the mean point of that vibration.

Other things being equal, the accuracy of the measurement is the greater, the smaller the amplitude of the vibration of the needle.

The frequency of the oscillatory movement of the needle may be of any value. If the frequency is high and, the needle penetrates on each oscillation the surface layer and displaces it very little, then the surface tension may be ignored. 50 cycles per second is a convenient frequency which satisfies this condition.

Experience shows that measurements made by a device of this type are completely trustworthy. The smallest noticeable level changes are a function of the amplitude of the movement of the point, and may be as little as $\frac{1}{100}$ of a millimeter. A thin layer of any extraneous substance tending to modify the surface tension of the liquid does not affect the measurement.

In the case of water or an aqueous solution, if a source of direct current is used in the measuring circuit, it is preferable to connect the negative pole to the point, so that electrolysis does not give rise to nascent oxygen which might in the course of time oxidize it.

Instead of measuring directly the mean value of the current in the circuit, it is of course also possible to measure the difference of potential, for example, which is produced at the terminals of a condenser shunting a resistance inserted in the circuit.

Figure 4:
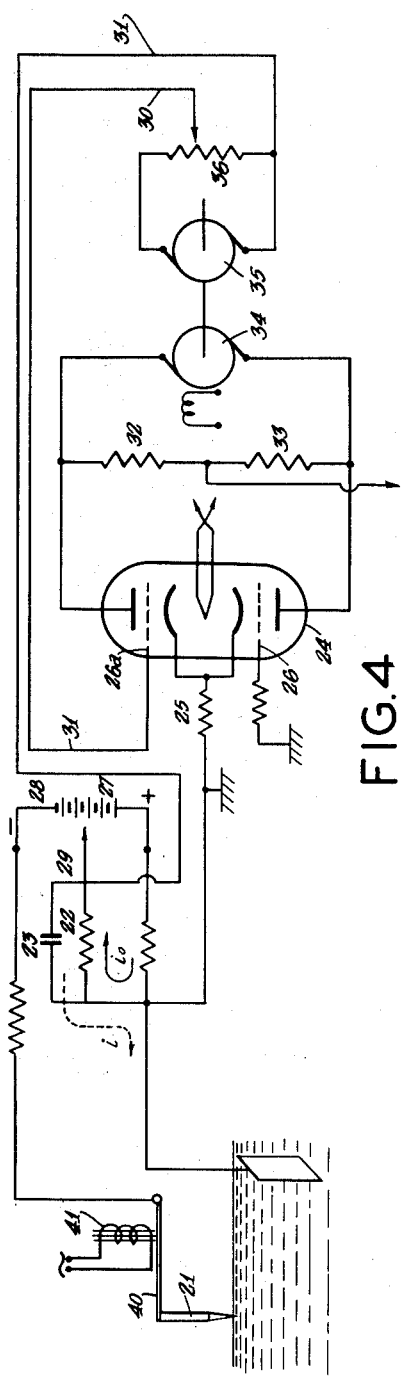
Figure 4 shows diagrammatically an example of the application of the invention to a level regulating device.

This is the case with the device illustrated in Fig. 4, in which a resistance 22 shunted by a condenser 23 is provided in the circuit of the point 21. The potential developed at the terminals of that condenser is applied to the input of an amplifier comprising, in the present case, a double triode 24 functioning in differential stage. The two cathodes are polarised by a common resistance 25, and one of the grids, namely 26, is earthed through a leakage resistance, the other grid 26a receiving the voltage developed at the terminals of the elements 22—23, to which may be added a feedback voltage over the wires 30, 31, as will be explained below. The voltage developed at the terminals of the elements 22—23 is due to the superimposition of two currents passing through the resistance 22 in opposite directions. This resistance is in two circuits including, respectively, the battery portions 27, 28 as determined by moving slider 29. The part 27 produces a steady current $i_0$, while the part 28 produces the pulsed current $i$ controlled by the height of the level of the liquid in relation to the trajectory of the point 21.

The difference of potential established between the anodes or tube 24 at the terminals of two symmetrical charging resistances 32, 33 is applied to a direct current motor 34, preferably of the independent excitation type, which drives a level regulating apparatus (not shown) of any suitable kind to change the amount of liquid in the reservoir.

It is seen that when the mean value of pulsed current $i$ is equal to the current $i_0$, that is to say when the voltage developed at the terminals of the condenser 23 and applied to the grid 26a is zero, the plate currents traversing the resistances 32, 33 are equal, the difference of potential between the terminals of the motor 34 is zero, and the regulating apparatus is not operated. The level of the liquid is at that time, for example, half-way between the upper and lower limits of the point 21. When the level rises or falls the motor 34 will be fed in the appropriate direction to ensure a correction of the difference by supplying more liquid or removing some.

To prevent self-oscillation, a counter-reaction may be arranged in the amplifier according to a well known technique, by feeding back to the input a voltage proportional at each moment to the corrective action applied. This may be achieved, for example, by providing the armature of the motor 34 with a second winding illustrated at 35 and functioning as a tachymetric dynamo. The latter supplies to the terminals of a potentiometer 36 a voltage proportional to the speed of the motor, an adjustable fraction of which is returned to the input of the amplifier by adding it to the control voltage.

Experience shows that such stabilisation is often not required; this will of course depend on the totality of the regulation parameters, such as the inertia of the liquid mass, that of the operating members (valves, etc.), the speeds of the variations possible, and so on.

In Fig. 4, the contact point 21 is carried at the end of a spring blade 40 placed in the alternating field of an electromagnet 41 connected to the mains or any other source of alternating voltage.

Figure 5:
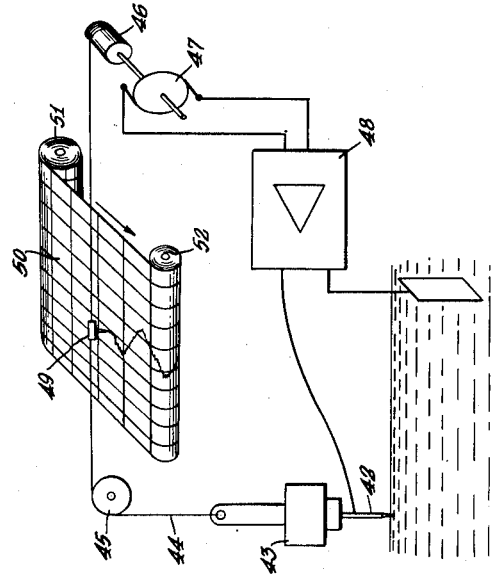
Figure 5 is a diagram illustrating a level recording device according to the invention.

Figure 5 shows a recording device for a variable level of liquid. The point 42, and also its motor 43, are here suspended at the end of a cable 44 passing over a guide pulley 45 and winding on to a drum 46 keyed on the shaft of a motor 47. This motor is fed by an amplifier 48, which may be of the type described with reference to Fig. 4, or of another appropriate type adapted to drive the motor 47 in such manner as to maintain the mean height of point 42 at the liquid surface by maintaining at a given value the mean current in the measuring circuit.

A recording stylus 49 carried by the cable 44 makes a permanent record of the level of the liquid on a recording strip 50, which is unwound at a suitable speed from a supply roll 51 on to a receiving roll 52.

Figure 6:
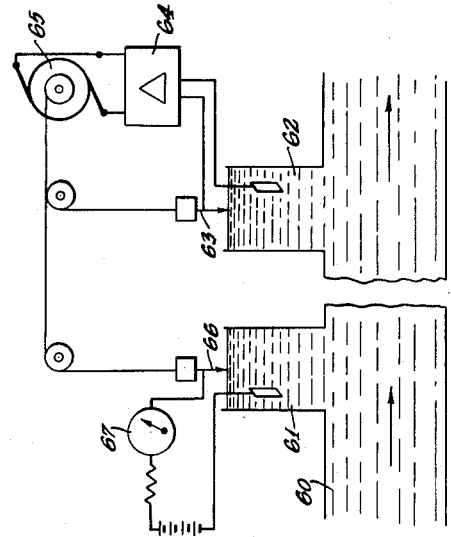
Figure 6 is a diagram relating to another embodiment of the device.

Figure 6 shows in a diagrammatic manner an example of the application of the invention to the measurement of very slight differences in two levels of liquid, for example, between two manometric tubes such as 61 and 62.

A point 63 is arranged to be permanently in contact with the level of the liquid in the tube 62, by means of a device of the type described with reference to Fig. 5, and comprising an amplifier 64 and a motor 65. The motor adjusts the point 63 so that the surface of the liquid coincides with the mean level of the vertical vibration of the point, that is to say that the time of immersion will be equal to half the total time.

Motor 65 controls at the same time a vibrating point 66 associated with the level of the liquid in the tube 61, so that the height of the vibrating point 66 is at all times equal to that of the point 63. The point 66 is inserted in a conventional measuring circuit of the type previously described comprising for example micro-ammeter 67.

If the levels at 61 and 62 are equal, the mean current in the measuring circuit of the point 66 will be equal to half its maximum value (for a symmetrical force vibration which has no even harmonics), and the needle of the instrument 67 will be placed in the middle of its stroke. When the level at 61 rises or falls in relation to the level at 62, the mean current in the measuring circuit will be modified and the corresponding deflection of the needle of the instrument 67 in one direction or the other will indicate with very great sensitivity the difference in the levels.

Such device because of its sensitivity permits the measurement or control of pressure losses which are very much smaller than those measured or controlled by hitherto known apparatus. The dimensions of the devices may, therefore, be reduced. Numerous other applications are obviously possible; for example, in the very wide field of the control of liquid outputs. The flow in a conduit such as 60 may thus be controlled by the value of the mean current in the measuring circuit of the point 66. If a variable element e. g. a cam were inserted in the transmission between the motor 65 and the point 66, a given flow could be obtained as a function of time.

The invention is of course not restricted to the embodiments illustrated, which have been given solely by way of example.

The source of current of the measuring circuit, for example, may just as well be an alternating current source the frequency of which will be selected at a value decidedly different in principle from that of the source feeding the motor of the vibrating contact. It could, for example, be decidedly higher, and in that case there will be in the measuring circuit a high frequency current subject to undulation of the type having impulses of variable duration. The measurement of the duration of the impulses which finally characterises the desired result and constitutes the nodal point of the invention, may be effected by various processes well known in telecommunications technique.

Without departing from the scope of the invention, the very numerous possible applications of the process described, both to measurement and to regulation, or to all the problems of control in general of any level of liquid, could easily be multiplied, provided only that the liquid in question is not an electrical insulator.

The advantages arising from the remarkable flexibility, the surprising accuracy, and the simplicity of the means required for carrying out this process will be obvious to those skilled in the art.

What we claim is:

1. A device for determining the height of an electrically conducting liquid comprising an electrically conducting member, means for mounting said member above the surface of the liquid, means for oscillating the mounting means at a predetermined frequency and at an amplitude for periodically moving said member to penetrate through the surface of the liquid, an electrical circuit including said member and the liquid, and means for measuring the average current flow in said circuit as a function of time of penetration of said member.

2. A device for recording the height of a body of electrically conductive liquid comprising a needle-like element, means for mounting the needle above said liquid, said means for mounting including an electric motor to vibrate the needle vertically at a predetermined frequency into and out of said liquid, an electrical circuit including the needle and the liquid, and means for measuring average current flow in said circuit as a function of time of penetration of the needle.

3. The device according to claim 2, and in which a resistance and an electrode permanently immersed in the liquid are included in said electrical circuit.

4. The device according to claim 2, amplifying means connected to said circuit, and a motor for regulating the amount of liquid connected to the output of said amplifying means.

5. The device according to claim 4, and in which said amplifying means comprises a double triode, a source of potential, two circuits connected to said source of potential, one of said circuits being the circuit which includes said needle, a resistance and a contact to said source of potential in said last mentioned circuit, the other circuit including said resistance and contact of the first circuit, and a common resistance connecting the cathodes of said triode to said circuits.

6. The device according to claim 5, and in which one of the grids of the triode is connected to ground, and a circuit connecting the other grid of the triode to said first circuit.

7. A device for measuring the difference in the height of the level of an electrically conducting liquid in two branches of a common liquid system, comprising a first needle of conducting material, means for suspending said needle over the liquid in said first branch, first means for moving said needle periodically to penetrate into and to move out of contact with the liquid in said first branch, a first electrical circuit including said first needle and the liquid in said first branch, means for measuring the amount of current in said first circuit, a second needle of conducting material, means for suspending said second needle over the liquid in said second branch, means for moving said second needle periodically to penetrate into and to move out of contact with the liquid in said second branch, a second circuit including said second needle and the liquid in said second branch, means for amplifying the current in said second circuit, a motor connected to the output of the amplifier and to said suspending means for the needles to vary in unison the distance of the needles from the liquid surfaces with which they cooperate.

References Cited in the file of this patent
UNITED STATES PATENTS

| Number | Name | Date |
|---|---|---|
| 2,053,938 | Barker, Jr. | Sept. 8, 1936 |
| 2,263,055 | Smith, Jr. | Nov. 18, 1941 |
| 2,380,436 | Holdman | July 31, 1945 |
| 2,433,599 | Cohen | Dec. 30, 1947 |
| 2,483,333 | Cannon, Jr. | Sept. 27, 1949 |
| 2,496,366 | Adelson | Feb. 7, 1950 |